United States Patent

Albanese

[15] 3,641,573
[45] Feb. 8, 1972

[54] PSEUDONOISE RADAR SYSTEM
[72] Inventor: Damian F. Albanese, Chatsworth, Calif.
[73] Assignee: International Telephone and Telegraph Corporation, New York, N.Y.
[22] Filed: Nov. 26, 1969
[21] Appl. No.: 880,057

[52] U.S. Cl............................................343/12 R, 343/5 R
[51] Int. Cl..................................................G01s 9/04
[58] Field of Search.................................343/5 R, 7.7, 12 R

[56] References Cited

UNITED STATES PATENTS 3,183,506  5/1965  Webb..............................343/12 R X
3,461,452  8/1969  Welter............................343/12 R

*Primary Examiner*—T. H. Tubbesing
*Attorney*—C. Cornell Remsen, Jr., Walter J. Baum, Paul W. Hemminger, Charles L. Johnson, Jr. and Thomas E. Kristofferson

[57] ABSTRACT

A radar system having the features of spillover discrimination and unambiguous range indication.

Spillover occurs in a continuous wave radar, for example, in direct transmission of electromagnetic energy from a transmitting antenna to a receiving antenna. It is desirable to suppress this energy in the receiver so that the target echo will come in clear. The invention provides this suppression by using a low-pass filter having a cutoff frequency less than $f_w$, where $f_w$ is the word rate in a pseudonoise radar system.

In the case of ambiguous range, the carrier is modulated with a pilot tone or range tone. If the range tone wavelength is at least twice as long as the maximum range desired, the received range tone may be filtered out and used with a phase detector to produce an unambiguous range indication.

8 Claims, 3 Drawing Figures

PSEUDONOISE RADAR SYSTEM

BACKGROUND OF THE INVENTION

This invention relates to continuous wave (CW) radar systems and, more particularly, to a pseudonoise radar system.

In determining the range of a moving target, a CW radar is often used, including a transmitter having a transmitting antenna and a receiver having a receiving antenna. Electromagnetic energy transmitted directly from the transmitter to the receiver is unwanted because the wave reflected from the target is that from which range is determined. This directly transmitted energy is called spillover.

Spillover can be partially attenuated in a pseudonoise radar system by decoding the incoming wave by a code delayed an amount directly proportional to the distance between the transmitting and receiving antennas. Then, by the use of a notch filter, a large portion of the spillover may be suppressed without substantially attenuating the wave reflected by the target.

Notwithstanding the foregoing, enough of the spillover energy is still left and is troublesome.

In prior art systems, it has been impossible to separate spillover from the desired signal other than by the means described above. This has been due to the character of the power spectrum of the spillover, which spectrum normally has lines which fall close to, on both sides of, and directly on those of the desired signal.

SUMMARY OF THE INVENTION

In accordance with the device of the present invention, the above-described and other disadvantages of the prior art are overcome by providing a pseudonoise radar system with a work rate, $f_w$, greater than the maximum target Doppler frequency shift, $f_d$, with which the system should operate properly. Further, if a pilot tone or range tone of frequency, $f_m$, is employed, preferably $f_w$ should be larger than $f_d + f_m$.

If such a system is employed, a low-pass filter having a cutoff frequency less than $f_w$ may be employed to attenuate spillover in addition to the apparatus described previously. The operation of this filter will be described in detail hereinafter.

It is another outstanding feature of the invention that a very large word rate may be employed to accommodate a very large Doppler shift. This would be impossible with prior art systems because a large word rate can create an ambiguity in range indication. An ambiguity is created when the work time, i.e., the reciprocal of the word rate, is short in comparison to $2R_m/C$, where $R_m$ is the maximum target range desired and $C$ is the velocity of light. In accordance with the present invention, this ambiguity is eliminated by modulating the carrier with a pilot tone or range tone, and phase detecting the demodulated carrier. If the range tone has a wavelength longer than $2R_m/C$, no ambiguity exists. The phase detected will be directly proportional to range.

The above-described and other advantages of the invention will be better understood from the following description when considered in connection with the accompanying drawings.

BRIEF DESCRIPTION OF THE DRAWINGS

In the drawings, which are to be regarded as merely illustrative.

DESCRIPTION OF THE PREFERRED EMBODIMENT

Figure 1:
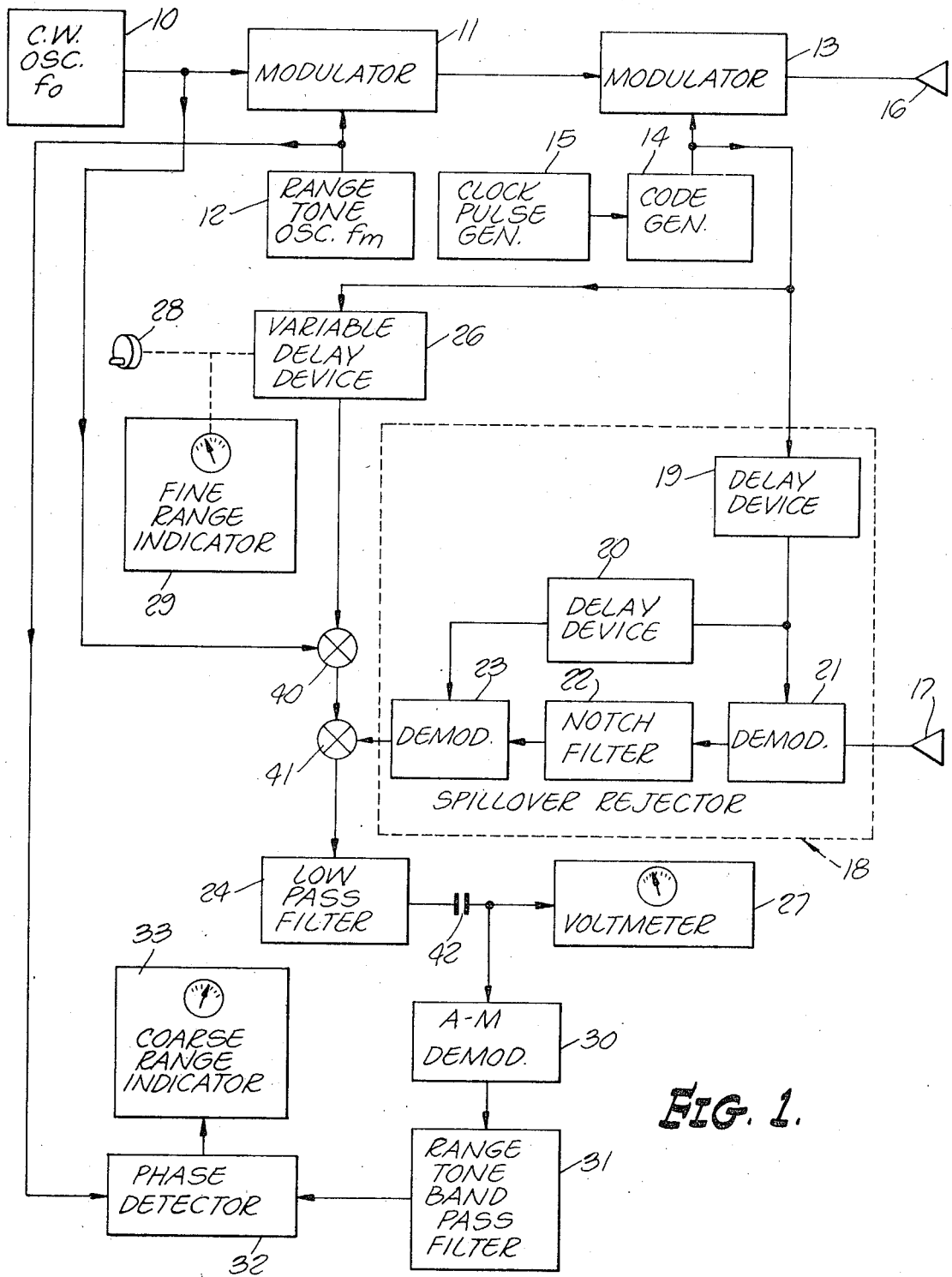
FIG. 1 is a block diagram of one embodiment of the present invention.

Continuous wave oscillator 10 produces an output signal of a radiofrequency $f_o$. This output signal is applied to a modulator 11. Modulator 11 is also supplied with an input signal from range tone oscillator 12. The range tone has a frequency $f_m$. The wavelength of the output of oscillator 12 should be larger than twice the maximum range desired. The maximum range desired is the maximum range at which a target is located when it is desired to utilize the apparatus shown in FIG. 1.

The output of oscillator 10 is amplitude modulated with the output of oscillator 12 by modulator 11. A modulator 13 is connected from modulator 11 to receive the output of the latter. A code generator 14 also supplies an input to modulator 13. Code generator 14 is operated by a clock pulse generator 15. Code generator 14 produces a serial binary code. The code is divided up into words. Each word has the same number of bits as every other word in the code. The coding arrangement of each word is also identical to all other words. Modulator 13 similarly maintains the phase of the input signal provided by modulator 11 at its output or reverses that phase depending upon the high or low level of each bit supplied by code generator 14. The output of modulator 13 is then broadcast from a transmitting antenna 16. The method of modulating the output of modulator 11 in modulator 13 is entirely conventional and is used as a method of producing pseudonoise.

After the output of modulator 13 is radiated, some radiation is transmitted directly to a receiving antenna 17. Other radiation travels to a moving target and is then reflected to antenna 17. The electromagnetic energy which is transmitted directly from antenna 16 to antenna 17 suppresses some of this energy. Spillover rejector 18 includes a delay device 19 connected from the output of code generator 17. Spillover rejector 18 also includes a delay device 20, a demodulator 21, a notch filter 22, and a demodulator 23. Demodulator 21 receives inputs from antenna 17 and delay device 19. Notch filter 22 is connected from demodulator 21 to demodulator 23. Delay device 20 is connected from delay device 19 to demodulator 23.

Figure 2:
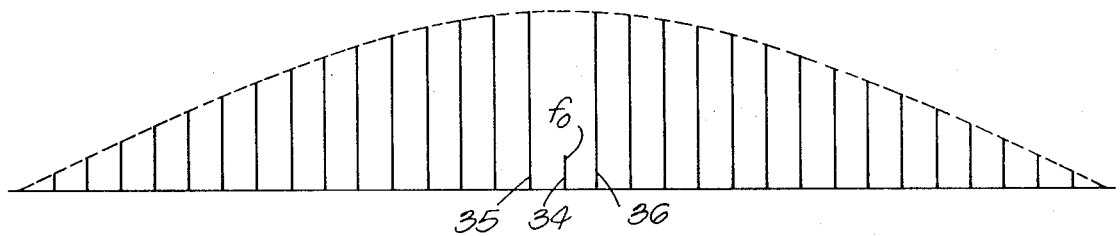
FIG. 2 is a graph showing the power spectrum of a pseudonoise coded wave.

Delay device 19 provides a delay approximately equal to $D/C$, where $D$ is the distance between antennas 16 and 17 and $C$ is the velocity of light. The coded output of generator 14 is thus impressed upon demodulator 21 with a delay equal to the delay of the transmission between antennas 16 and 17. The spillover is thus demodulated. A signal reflected from a target will have a delay different from that of the spillover. Demodulator 21 will thus not demodulate the reflected wave. Moreover, the reflected wave will have a Doppler shift which will miss the notch filter 22. Notch filter 22 substantially attenuates the demodulated spillover because it is located approximately at $f_o$. However, notch filter 22 does not substantially effect energy from the reflected wave because the energy of the reflected wave has a power spectrum as shown in FIG. 2. Further, if it is decoded, it will have the Doppler shift. On the other hand, the spillover energy is almost entirely located in the frequency of the line 34 because it has been demodulated.

Demodulating is performed exactly in the reverse manner of coding.

Due to the fact that a demodulator 21 demodulates spillover with a delay different from the delay of the reflected wave, the demodulation of the spillover acts as a superimposed code on the reflected wave. It is desirable to remove the superimposed code used in spillover demodulating. For this purpose, demodulator 23 is provided. Delay device 20 provides an additional delay to the code equal to the delay of filter 22. Notwithstanding the utility of spillover rejector 18, the output of demodulator 23 will still contain some spillover energy. A low pass filter 24 is employed to reject this additional spillover. Filter 24 preferably has a cutoff frequency less than $f_w$, where $f_w$ is the word rate of code generator 14. Otherwise, the passband of filter 24 should preferably occupy substantially the entire band between 0 and $f_w$. The reason for these conditions will be explained hereinafter.

The reflected wave is demodulated by two conventional mixers 40 and 41 which are connected from oscillator 10 and the output of demodulator 23 to the input of filter 24. A delayed code input to mixer 40 is provided by a variable delay device 26 connected from code generator 14. Oscillator 10 also provides an input to mixer 40. The output of mixer 40 is impressed with the output of demodulator 23 on mixer 41. The output of mixer 41 is impressed upon filter 24. The output of filter 24 is indicated by a voltmeter 27 connected thereto by a DC blocking capacitor 42. The delay of device 26 is determined by the setting of manually adjustable hand wheel 28. A fine range indicator 29 is connected from hand wheel 28 to indicate the range corresponding to the delay of device 26.

An amplitude demodulator 30, a range tone bandpass filter 31, and a phase detector 32 are successively connected to the output of filter 24. Phase detector 32 also receives an input form oscillator 12. The output of phase detector 32 is impressed upon a course range indicator 33 which produces a visual indication of the voltage amplitude of the output signal of phase detector 32.

Code generator 14 is constructed to produce a word rate at least greater than the maximum Doppler shift, $f_d$, and preferably generates a code at a word rate greater than $f_d+f_m$. The Doppler shift referred to above is the center frequency of the reflected wave minus $f_o$, i.e., the shift in frequency which is produced by a moving target.

The reasons for the conditions described above will now be explained. When an RF signal is substantially pure in frequency, it will have a very small spread. However, as stated previously, pseudonoise coding will spread out the carrier power as shown in FIG. 2. Further, the line 34 will have an amplitude of (20 log $N$)db. down from the carrier amplitude before modulation, where $N$ is the number of bits in each word. Lines 35 and 36, on opposite sides of line 34, will have an amplitude of (10 log $N-3$)db. down from the carrier amplitude before modulation. Each pair of adjacent lines are located apart a spread of $f_w$. The envelope of the lines is given by the familiar function sin $x/x$.

Figure 3:
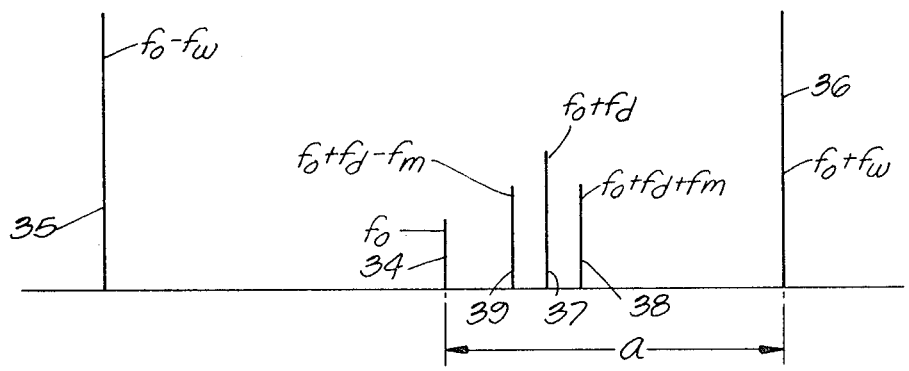
FIG. 3 is an enlarged graph of a portion of the spectrum shown in FIG. 2.

At the output of demodulator 23, spillover lines will still appear at 34, 35, and 36 as shown in FIGS. 2 and 3. The Doppler frequency of a reflected wave may be located at 37. The side bands of the Doppler, due to the modulation of $f_m$, may be located at 38 and 39.

Note will be taken that if the band spread A, which is $f_w$, is larger than the maximum Doppler shift for which the apparatus should be operable, i.e., $f_d$, line 37 may always be distinguished in frequency from lines 34 and 36. The manner in which this condition is related to the apparatus of FIG. 1 is that $f_w$ must be larger than $f_d$. However, as will be described, it is desirable to detect the side bands of line 37. For this reason, $f_w$ should be greater than $f_d+f_m$. It is by the condition of word rate that it is possible to usefully employ filter 24.

The effect of mixers 40 and 41 is to demodulate the output of demodulator 23 so that all lines to the left of line 34 in FIG. 3 disappear. Line 34 then becomes DC and all lines to the right of line 34 become smaller in frequency by subtracting $f_o$. Thus, line 39 becomes $f_d-f_m$; line 37, $f_d$; line 38, $f_d+f_m$; and line 36, $f_w$.

By making filter 24 have an upper cutoff frequency less than $f_w$, the rejection of the spillover line 36 is accomplished. Sometimes spillover line 34 can be tolerated due to its low amplitude. Note will be taken that the reflected wave will be demodulated by mixers 40 and 41. Thus, substantially all of the energy thereof will be located in line 37 and side bands 38 and 39. The frequency of said bands 38 and 39 will be very little different from that of line 37, the same being exaggerated in FIG. 3. Thus, by the use filter 24, it is possible to attenuate the balance of the spillover except for the spillover line 34.

Notwithstanding the foregoing, however in the apparatus in FIG. 1 for reasonable values of $f_d$, it may be necessary to make $f_w$ relatively large. This, it is not possible, in some practical cases, to obtain range information from a reflected wave if the time from transmission to reception is long in comparison to a word interval, that is, the reciprocal of $f_w$. For this reason, indicator 29 shown in FIG. 1 may indicate only a fraction of the range of a target. This fraction will be in addition to some whole integral number of word intervals times the velocity of light. For this reason, the use of the range tone is made. By making the wavelength of the range tone larger than twice the maximum range desired, it is possible for indicator 33 to indicate total range. However, indicator 33 will not indicate total range with considerable accuracy. Thus, indicator 29 will and the apparatus of FIG. 1 may be constructed so that indicator 29 will indicate range in feet from 0 to 1,000. Indicator 33 may indicate range in feet from 0 to 10,000. Thus, if indicator 33 indicates a range of from between 7,000 to 8,000 and indicator 29 indicates a range of 440, the total accurate range will be 7,440.

The operation of the apparatus shown in FIG. 1 may be summarized as follows. The carrier produced by oscillator 10 is amplitude modulated by the range tone in modulator 11. Modulator 12 modulates the output of modulator 11 according to a pseudonoise code. The output of modulator 13 is radiated toward a moving target. Antenna 17 receives energy directly radiated to it from antenna 16 and energy reflected from the target. Spillover rejector 18 attenuates some spillover. Hand wheel 28 is turned until voltmeter 27 reaches a maximum reading. The voltmeter 27 will read low if the delay of the device 26 is too great or too small. Indicators 29 and 33 may then be consulted to determine accurate range. Delay device 26 actually aligns in time the code of the output of generator 14 is synchronized with the code of the reflected wave. When the codes match, full demodulation is accomplished by mixers 40 and 41. Voltmeter 27 then reads a peak value. Spillover is further attenuated by filter 24.

From the foregoing, it will be appreciated that the adjustment of device 26 by hand wheel 28 may be made automatically, that is, the adjustment may be made electronically as a function of the output of filter 24. Further, connections may be made to device 26 and phase detector 32 for producing a single complete and accurate range indication by combining the outputs thereof.

In the automatic operation of device 26, provision may be made for both electronic search and track operations.

The code of the present invention and the method of modulation thereby may be changed without departing from the present invention.

Capacitor 42 may be connected before or after any stage subsequent to the output of mixer 41. Capacitor 42 eliminates line 34 when it is DC. Since the invention may work without eliminating line 34, in such cases, capacitor 42 may be eliminated and a direct coupling used, capacitor 42 normally operating as a DC blocking capacitor for the direct current represented by line 34.

What is claimed is:

1. A radar system comprising: first means for transmitting a carrier wave having a digital code modulation with all words in the code being identical, said words being generated at a rate, $f_w$, larger than the maximum expected Doppler shift, $f_d$, to be encountered in reflection of said wave from a target; second means for reducing a wave reflected from a target to its Doppler shift frequency; and a low-pass filter adapted to receive the output of said second means, said filter having a cutoff frequency less than $f_w$.

2. The invention as defined in claim 1, wherein said code is a binary code, said first means including a carrier oscillator, a first modulator, a range tone oscillator, said first modulator modulating the output of said carrier oscillator in accordance with the output of said range tone oscillator, the wavelength of the output of said range tone oscillator being larger than $2R_m/C$, where $R_m$ is the maximum range desired and $C$ is the velocity of light, a second modulator connected to receive the output of said first modulator, a code generator to operate said second modulator in a manner to maintain and to reverse the phase of said carrier in accordance with said binary code, said first means including a transmitting antenna, a receiving antenna located a predetermined distance, $D$, from said transmitting antenna, a first demodulator connected from said receiving antenna, a first delay device connected from said code generator to said first demodulator to decode spillover, said first delay device providing a delay approximately equal to $D/C$, a notch filter having a center frequency of about $f_0$ connected from said first demodulator, a second demodulator connected from said notch filter, third means to provide a delayed code input to said second demodulator to remove the coding of a reflected wave provided by said first demodulator, said third means providing a delay of about $D/C+d$, where $d$ is the delay of said notch filter, a variable delay device connected from said code generator, a low-pass filter, said second means including first and second mixers, said first mixer being connected from said second mixer and said second demodulator to said low-pass filter, said second mixer being connected from said carrier oscillator and said variable delay device, fourth means calibrated in range to provide an indication of the delay setting of said variable delay device, a voltmeter connected from said low-pass filter, an amplitude demodulator connected from said low-pass filter to derive said range tone from said Doppler shift, a band-pass filter connected from said amplitude demodulator to pass said range tone, a phase detector connected from said range tone oscillator and said band-pass filter, and a course range indicator for producing a range indication directly proportional to the output of said phase detector, said low-pass filter having a coupling capacitor connected therefrom to said voltmeter and to said amplitude demodulator.

3. The invention as defined in claim 1, wherein said code is a serial binary code, said code including a series of binary bits for each word, each word having the same number of bits, the coding of said series being identical for each word, said first means including a code generator and a modulator connected to modulate said carrier, said modulator maintaining and reversing the phase of said carrier according to said code.

4. The invention as defined in claim 1, including a transmitting antenna and a receiving antenna and a spillover rejector connected between said receiving antenna and said second means, said spillover rejector comprising a first demodulator connected from said antenna, a code generator to supply the code for said first means, a first delay device connected from said code generator to said first demodulator to decode the spillover, said first delay device providing a delay of said code of about $D/C$, where $D$ is the distance between said antennas and $C$ is the velocity of light, a second demodulator, a notch filter connected between said first and second demodulators, said notch filter having a center frequency of about $f_o$, and means to introduce said code to said second demodulator with a delay from said code generator equal to the delay of said first delay device plus the delay of said notch filter.

5. The invention as defined in claim 1, including means to produce an output proportional to the misalignment of the codes of the transmitted and reflected waves, said misalignment being proportional to a portion of the range of a target, means to modulate said carrier with a range tone before broadcast, means to derive said range tone from the received signal, and means for producing an output signal proportional to the difference between the phases of the transmitted and received range tones, said range tone having a wavelength longer than twice the maximum range desired.

6. The invention as defined in claim 5, including means calibrated in range to indicate the said misalignment of said codes, and means calibrated in range to indicate said difference in phases.

7. The invention as defined in claim 1, wherein a DC blocking capacitor is connected at a position after said secured means to block the DC output thereof.

8. The invention as defined in claim 1, wherein the passband of said filter minus $f_w$ is small in comparison to $f_w$.

* * * * *